| United States Patent [19] | [11] 3,856,340 |
|---|---|
| Faulkner | [45] Dec. 24, 1974 |

[54] ROPE DROPS

[76] Inventor: Robert W. Faulkner, 8296 Park Ave., Garrettsville, Ohio 44231

[22] Filed: Nov. 21, 1973

[21] Appl. No.: 418,072

[52] U.S. Cl. .............................. 294/19 R, 114/230
[51] Int. Cl. ............................................. A47f 13/06
[58] Field of Search ...... 294/1 R, 19 R, 78 R, 86 R; 47/1; 114/221 R, 230; 119/151, 153

[56] References Cited
UNITED STATES PATENTS

| 2,688,510 | 9/1954 | Heyser | 294/19 R |
| 2,700,252 | 1/1955 | Paganelli | 47/1 |
| 3,072,429 | 1/1963 | Stipan | 294/19 R |
| 3,774,953 | 11/1973 | Babcock | 294/19 R |

Primary Examiner—Richard A. Schacher
Assistant Examiner—Johnny D. Cherry
Attorney, Agent, or Firm—Michael Williams

[57] ABSTRACT

A mechanical device for placing a rope over a limb or through the crotch of a tree, or over any object, such as a pipe or structural member disposed at some height from the floor or ground level. The device is useful in the hanging of a swing or rope ladder, a block and tackle, or other similar uses.

The device is inexpensive to produce and comprises two main parts, namely, a cradle and a spool. The rope to be passed over the tree limb is wound on the spool and the latter is then placed within the cradle. A relatively long pipe is connected to the cradle so that the latter may be elevated to desired height by a person standing on the ground or floor level. The cradle is elevated to position wherein it rests on the tree limb, the free end of the rope dangling from the spool so as to be accessible to the person on the ground. A quick pull on the free end of the rope causes the spool to roll along tracks on the cradle a sufficient amount so that the spool drops from the cradle, over the tree limb, and falls to the ground, unwinding rope as it falls.

7 Claims, 4 Drawing Figures

ROPE DROPS

BACKGROUND AND SUMMARY

The problem solved by my invention is one that frequently arises when one desires to place a rope over an object which is some distance above the ground or floor line.

Heretofore one method employed to pass a rope over a tree limb was to toss a portion of the rope over the limb, but this was difficult to do, especially if the limb was some distance above the ground, or if other limbs interferred. Also, pole arrangements were tried, but they were complicated and unreliable.

My invention provides a simple and inexpensive device to effectively perform the task of placing a rope over a tree limb or the like. The rope is wound about a spool and the latter is disposed within a cradle. A long pipe attached to the cradle is used to elevate the latter to rest on the limb and a quick pull on a depending part of the rope causes the spool to roll along tracks on the cradle, momentum of the spool causing it to drop off the tracks and to the ground, and unwind rope as it falls.

DESCRIPTION OF THE DRAWINGS

In the drawings accompanying this description and forming a part of this application, there is shown, for purpose of illustration, an embodiment which my invention may assume, and in these drawings.

DESCRIPTION OF THE PREFERRED EMBODIMENT

Figure 1:
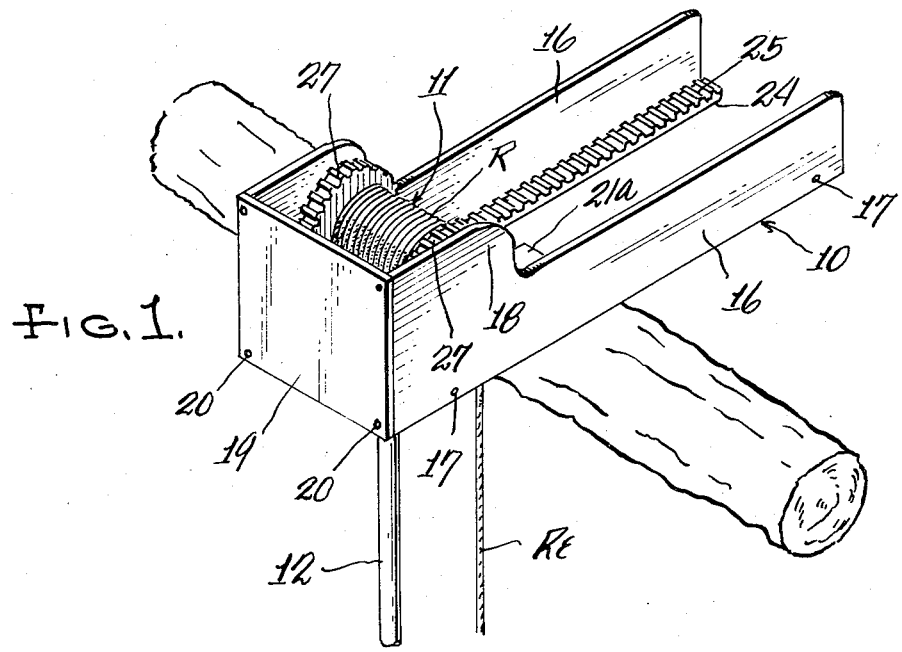
FIG. 1 is a perspective view of my improved rope drop, showing it in position ready to be actuated, certain parts being omitted in the interest of clarity.

As seen in the several views, my improved rope drop comprises a cradle 10 and a spool 11, and both may be made of any suitable rigid material, such as metal or plastic. A long pipe 12 is threaded into a socket 14 which extends from the undersurface of an elongated base portion 15 of the cradle. Spaced side plates 16—16 are connected to opposite longitudinal margins of the base portion, by means of screws 17, or by welding, cementing, or the like. Each side plate 16 is of increased width, as indicated at 18, and an end plate 19 is connected by screws 20, or the like, to close one end of the open, box-like structure formed by the base portion 15 and the side plates 16.

The base portion 15 is formed with a pair of longitudinal extending slots 21—21 which extend from a point 23 (see FIG. 4) toward the free end 22 of the base. Elongated tracks 24—24 are thus provided by the base portion and each track extends inwardly of a respective side plate 16. Each track is formed with upwardly extending gear teeth 25 and these teeth may be either cut into the tracks, or the form of thin gear racks which overlie and are secured to respective tracks. A short center span 21a of the base portion is also disposed between the tracks.

The spool 11 comprises a tube 26 with enlarged wheels 27—27 secured to opposite ends. The wheels preferably take the form of gears which mesh with the teeth 25 of the tracks 24. The spool is of an axial length so that the side plates 16—16 confine the spool therebetween but permit the spool to freely move along the tracks 24—24. A rope R is level-wound on the tube 26 and has its innermost end 28 (FIG. 4) secured to the tube. The outermost end of the rope is adapted to extend through one of the slots 21 and downwardly toward the ground, in position to be grasped by the person operating the rope drop.

Figure 2:
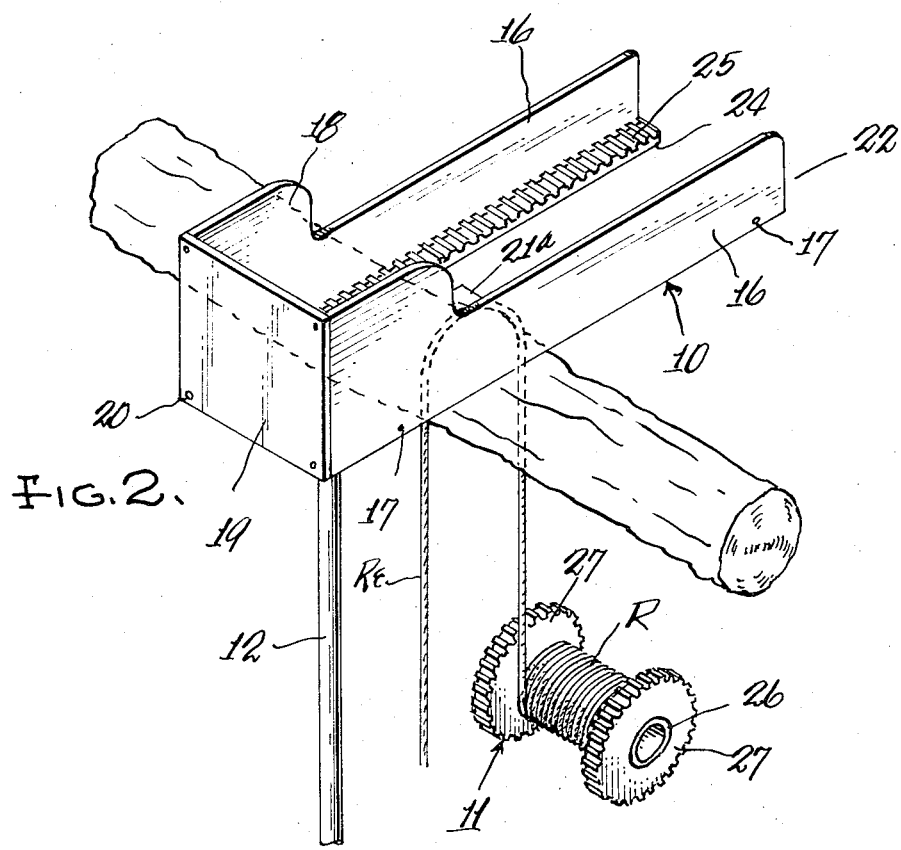
FIG. 2 is a similar perspective view, showing the spool dropping from the cradle.
Figure 4:
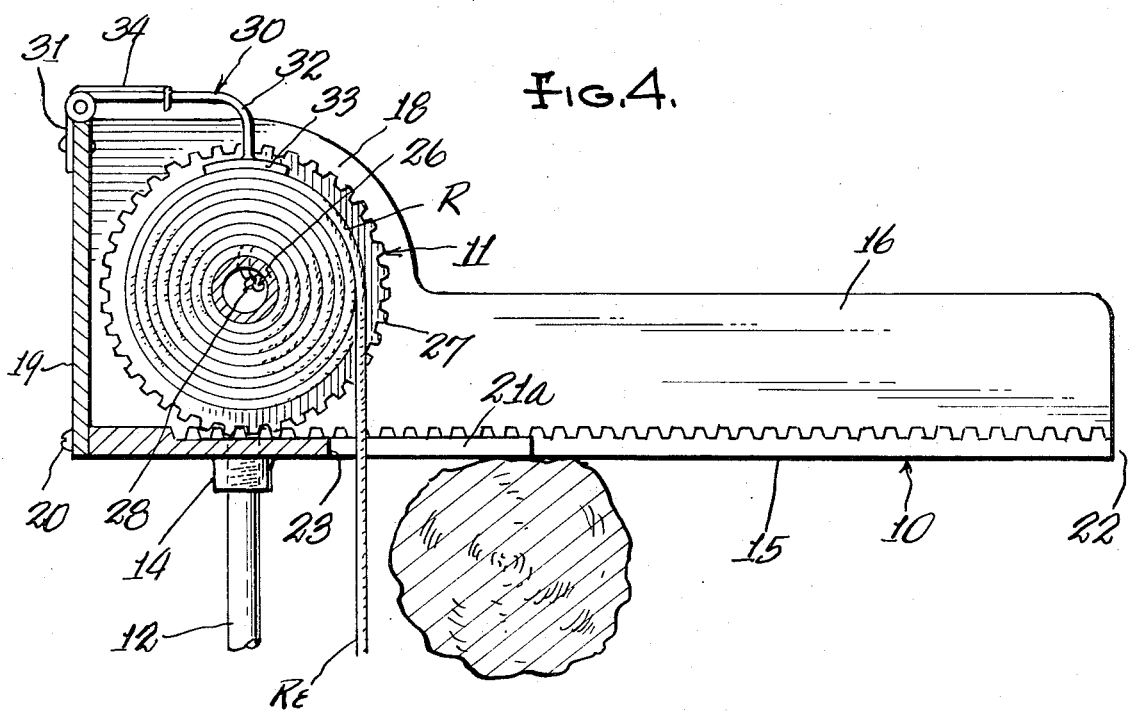
FIG. 4 is a sectional view corresponding generally to the line 4—4 of FIG. 3.
Figure 3:
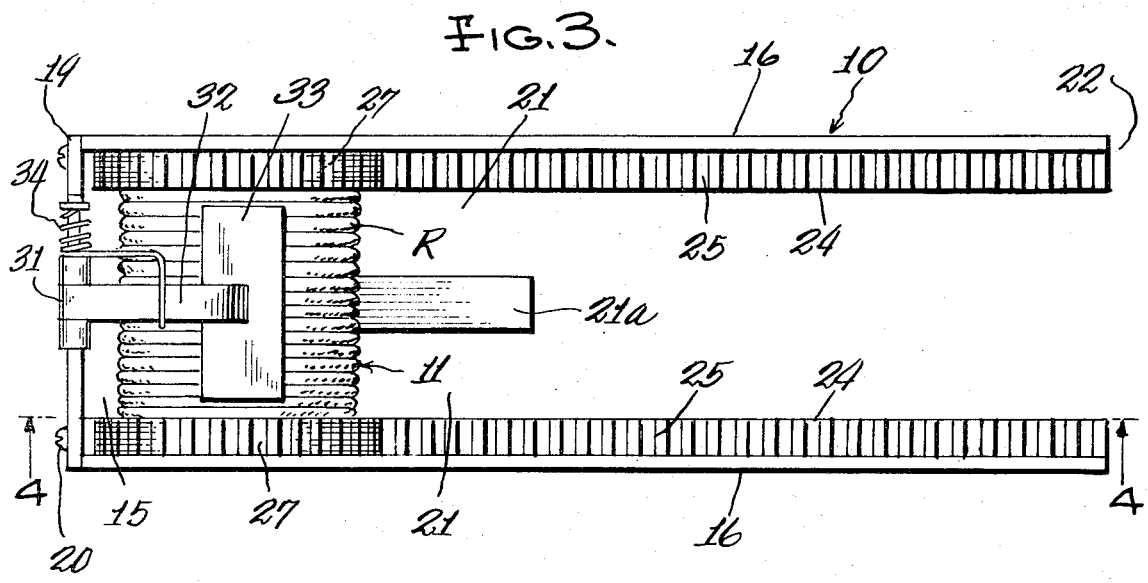
FIG. 3 is an enlarged, top plan view of the rope drop.

As seen in FIGS. 3 and 4 (but omitted from FIGS. 1 and 2 in the interest of clarity of disclosure) a hold-down device 30 is provided to releasably hold the spool against accidental displacement. The hold-down device, in the disclosed embodiment, comprises a hinge having one portion 31 connected to the end plate, and the other portion 32 terminating in a foot 33 overlying the spool and pressed against the rope wound on the spool by means of a coil spring 34.

In use, the assembly shown in FIGS. 1, 3 and 4 is elevated to desired height so that its base portion 15 is above, and preferably rests on a tree limb (or other object over which the rope is to be passed) and is held in such position by the operator who is holding the pipe 12. As seen in FIGS. 1 and 4, the rope end Re extends down through a slot 21 and is of sufficient length so that it may be grasped by an operator on the ground. The rope end Re extends to the left of the tree limb (as viewed in FIG. 4). A quick pull on the rope end Re causes the spool to be released from the hold-down device 30 and roll to the right along the toothed tracks 24. The gears 27—27 mesh with the toothed tracks 24—24 to prevent any slippage when a quick pull is applied to the rope end Re, and thus positively propel the spool to the right along the tracks 24—24. The momentum of the spool will cause it to drop off the track ends which, as seen, extend beyond the right of the tree limb. When the spool drops off the tracks 24—24, it will fall toward the ground and rope will unwind from the spool during this action. FIG. 2 shows the spool on its way to the ground and it will be seen that the rope has been passed over and around the tree limb.

I claim:

1. A rope drop, comprising:

a spool, having rope wound thereon, a cradle, having elongated track means, said cradle releasably supporting said spool at one end of said track means, support means operated by a person at ground level for elevating said cradle and the spool supported thereby to a position above an object over which the rope is to be dropped, with said one end of said track means disposed on one side of said object and the opposite end of said track means disposed on the opposite side of said object, a free end of said rope extending from the part wound on said spool and extending downwardly on said one side of said object, whereby a pull on said rope free end propels said spool along said track means to cause it to drop off the latter and fall toward the ground, said spool unwinding rope as it falls.

2. The construction according to claim 1, wherein said support means comprises an elongated rigid member, such as a pipe, having one end connected to said cradle, and its other end adapted to be grasped by a person at ground level.

3. The construction according to claim 1 wherein said cradle includes a base and spaced sides connected to and extending upwardly from said base, and wherein said spool is of an axial length to fit between said sides and held thereby against axial displacement from said cradle.

4. The construction according to claim 3 wherein said track means comprises a pair of tracks on said base, each track extending inwardly of a respective one of said sides, and said spool comprises a center portion about which the rope is wound, and a pair of wheels connected to said center portion and spaced apart to cooperate with said tracks for rolling engagement therealong.

5. The construction according to claim 4 wherein said tracks are in the form of toothed racks, and said wheels are in the form of gears meshing with respective racks.

6. The construction according to claim 3 wherein an end wall is disposed to close the space defined by said base and sides at said one end of said track means, and forming a barrier for said spool at said track means one end.

7. The construction according to claim 6 wherein a hold-down device is carried by said end wall and is operative to engage said spool and releasably hold it against movement along said track means, the pull on said rope free end overcoming the holding action of said hold-down device.

* * * * *